United States Patent
Beam et al.

(10) Patent No.: US 7,953,973 B2
(45) Date of Patent: May 31, 2011

(54) SYSTEMS, METHODS, AND COMPUTER PROGRAM PRODUCTS FOR PASSIVELY ROUTING SECURE SOCKET LAYER (SSL) ENCODED NETWORK TRAFFIC

(75) Inventors: James Frederick Beam, Raleigh, NC (US); Byron Lee Hargett, Apex, NC (US); Douglas Wayne Hester, Cary, NC (US); Ricky G. Millham, Cary, NC (US); Jennifer Justina Short, Apex, NC (US); Garth Douglas Somerville, Cary, NC (US); Jason Moore Walker, Chapel Hill, NC (US); Virgil Montgomery Wall, Apex, NC (US); Robert Edward Ward, Morrisville, NC (US)

(73) Assignee: Radware Ltd., Tel Aviv (IL)

(*) Notice: Subject to any disclaimer, the term of this patent is extended or adjusted under 35 U.S.C. 154(b) by 1066 days.

(21) Appl. No.: 11/655,722

(22) Filed: Jan. 19, 2007

(65) Prior Publication Data

US 2008/0175245 A1    Jul. 24, 2008

(51) Int. Cl.
*H04L 9/32* (2006.01)
(52) U.S. Cl. ........................ 713/168; 713/151
(58) Field of Classification Search ............... 713/168, 713/150–151
See application file for complete search history.

(56) References Cited

U.S. PATENT DOCUMENTS

| | | | |
|---|---|---|---|
| 7,165,175 B1* | 1/2007 | Kollmyer et al. | 713/154 |
| 7,421,501 B2* | 9/2008 | Critchley et al. | 709/227 |
| 7,469,338 B2* | 12/2008 | Buer | 713/170 |
| 7,623,883 B2* | 11/2009 | Park et al. | 455/519 |
| 7,788,726 B2* | 8/2010 | Teixeira | 726/26 |
| 2003/0018891 A1* | 1/2003 | Hall et al. | 713/160 |
| 2004/0168050 A1* | 8/2004 | Desrochers et al. | 713/153 |
| 2005/0050316 A1* | 3/2005 | Peles | 713/151 |
| 2005/0198099 A1* | 9/2005 | Motsinger et al. | 709/200 |
| 2006/0050889 A1* | 3/2006 | Lee | 380/286 |
| 2006/0227754 A1* | 10/2006 | Ko | 370/338 |
| 2007/0109995 A1* | 5/2007 | Quigley et al. | 370/329 |
| 2008/0144655 A1* | 6/2008 | Beam et al. | 370/466 |
| 2009/0077192 A1* | 3/2009 | Nishibayashi et al. | 709/207 |
| 2009/0132714 A1* | 5/2009 | Blander et al. | 709/227 |

\* cited by examiner

*Primary Examiner* — Matthew B Smithers
*Assistant Examiner* — Jing Sims
(74) *Attorney, Agent, or Firm* — Katten Muchin Rosenman LLP

(57) ABSTRACT

Methods, systems, and computer program products for passively routing secure socket layer (SSL) encoded network traffic are disclosed. According to one aspect, a method includes passively receiving a copy of SSL encoded network traffic. Further, the method includes passively parsing the received network traffic and generating an identical copy of the network traffic such that the network traffic is not decrypted and without interfering with the network traffic. A target output network device can be selected for transmission of the identical copy of the network traffic. The identical copy of the network traffic can be transmitted from the selected target output network device.

4 Claims, 6 Drawing Sheets

SYSTEMS, METHODS, AND COMPUTER PROGRAM PRODUCTS FOR PASSIVELY ROUTING SECURE SOCKET LAYER (SSL) ENCODED NETWORK TRAFFIC

RELATED APPLICATIONS

The present nonprovisional patent application claims the benefit of the U.S. Provisional Patent Application No. 60/874,795 entitled 'Passive Load Balancing Approach for Promiscuously Obtained Duplex Secure Sockets Layer Network Traffic' and filed Dec. 14, 2006, the disclosure of which is incorporated herein by reference in its entirety.

TECHNICAL FIELD

The subject matter described herein relates to routing network traffic. More particularly, the subject matter described herein relates to methods, systems, and computer program products for passively routing secure socket layer (SSL) encoded network traffic.

BACKGROUND

Passive collection of network traffic involves obtaining copies of network streams from inline switches, hubs, network taps, or other devices that can produce copies of full duplex data streams. Alternate approaches to passive collection of network traffic can employ inline processing devices such as network switches. Inline network switches often offer the capability to copy network data streams via mirror or span ports. Passively collected traffic has a number of uses such as network data analysis, intrusion detection, fraud analysis, threat analysis, and data archiving. Passively collected network traffic offers advantages in that it does not introduce latency or interfere with the normal network traffic data streams.

Passive collection of network traffic can be accomplished by generating copies of the original inline network streams. These copies can be generated by devices known as passive inline network taps. The devices work by copying the electrical signals used to convey the original network data streams. The electrical copies are placed on different network wires and as such reproduce, or copy the original network traffic.

When network traffic is passively collected, it is typically passed to a system for analysis, parsing, or archiving. Such systems have finite processing capabilities and more than one system may be necessary to handle the required total computational loads. In these scenarios, routing the passively collected network traffic to multiple recipients may be necessary.

Routing of passively collected network traffic involves taking the original copy of the passively collected network traffic and creating new copies of the network traffic. New copies can be transmitted onto a network with possible reception from zero or more recipients.

SSL is a protocol in wide use on the Internet for securing, via encryption, data communications. SSL was developed by Netscape Communications Corp., of Mountain View, Calif. Version 3 of SSL is in wide use in most web browsers, with version 3.1 (also known as TLS v1) also in wide deployment. It would be beneficial to provide improved systems for passively obtaining and routing SSL encoded network traffic. Further, it would be beneficial to provide a system capable of passively obtaining a copy of SSL encoded network traffic and capable of routing the copies to multiple output devices based on a common stream of SSL network traffic.

Accordingly, in light of the above described needs, there exists a need for improved methods, systems, and computer program products for passively routing SSL encoded network traffic.

SUMMARY

The subject matter described herein includes methods, systems, and computer program products for passively routing SSL encoded network traffic. According to one aspect, the subject matter described herein includes a method for passively routing SSL encoded network traffic. The method includes passively receiving a copy of SSL encoded network traffic. Further, the method includes passively parsing the received network traffic and generating an identical copy of the network traffic such that the network traffic is not decrypted and without interfering with the network traffic. A target output network device can be selected for transmission of the identical copy of the network traffic. The identical copy of the network traffic can be transmitted from the selected target output network device.

As used herein, a "computer readable medium" can be any means that can contain, store, communicate, propagate, or transport the computer program for use by or in connection with the instruction execution machine, system, apparatus, or device. The computer readable medium can be, for example, but not limited to, an electronic, magnetic, optical, electromagnetic, infrared, or semiconductor machine, system, apparatus, device, or propagation medium.

More specific examples (a non-exhaustive list) of the computer readable medium can include the following: a wired network connection and associated transmission medium, such as an Ethernet transmission system, a wireless network connection and associated transmission medium, such as an IEEE 802.11(a), (b), or (g) or a Bluetooth™ transmission system, a wide-area network (WAN), a local-area network (LAN), the Internet, an intranet, a portable computer diskette, a random access memory (RAM), a read only memory (ROM), an erasable programmable read only memory (EPROM or Flash memory), an optical fiber, a portable compact disc (CD), a portable digital video disc (DVD), and the like.

It is an object of the presently disclosed subject matter to provide passively routing SSL encoded network traffic.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

Preferred embodiments of the subject matter described herein will now be explained with reference to the accompanying drawings of which.

DETAILED DESCRIPTION

Figure 1:
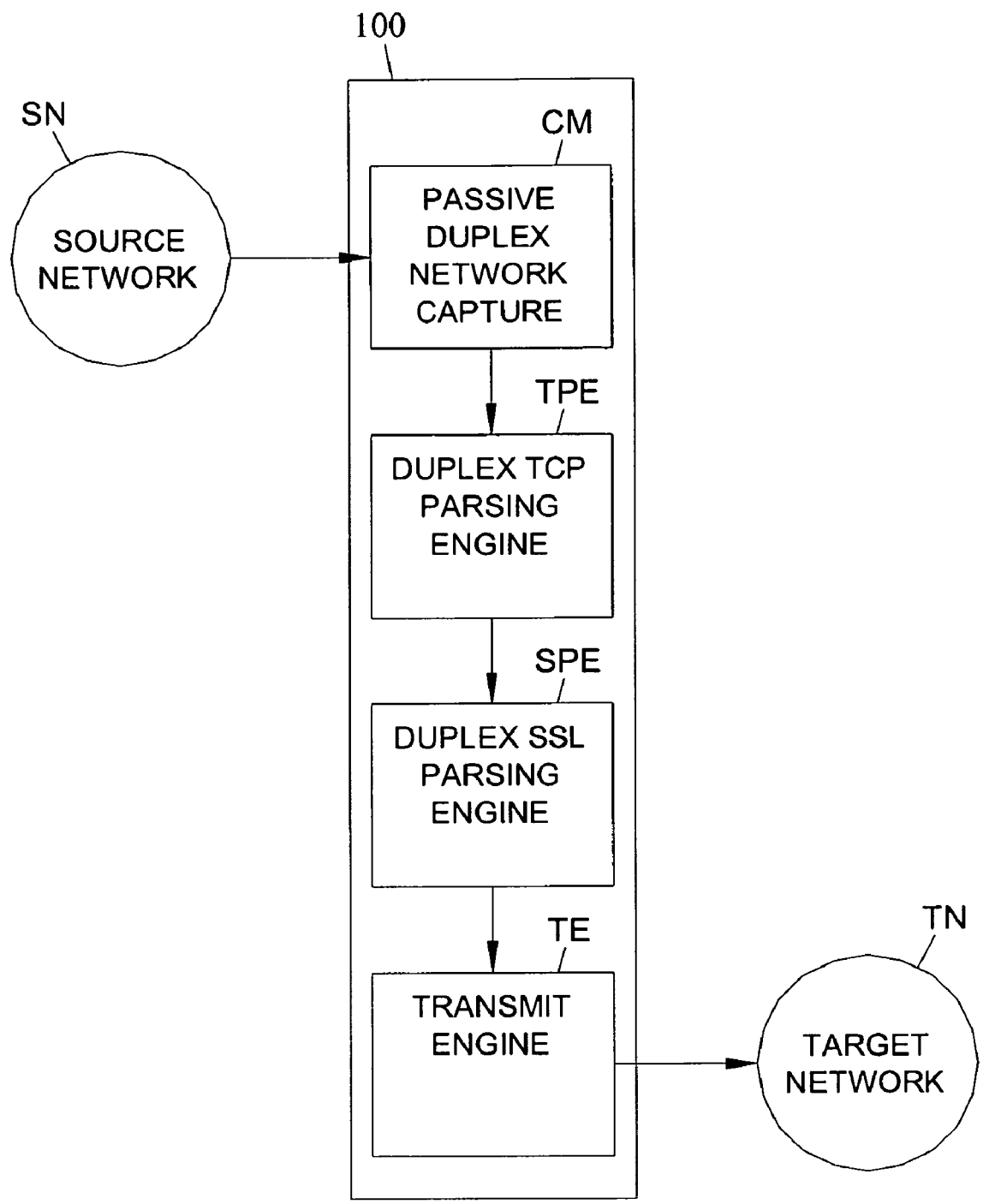
FIG. 1 is a block diagram of an exemplary system for passively routing SSL encoded network traffic according to an embodiment of the subject matter described herein.

The subject matter described herein includes methods, systems, and computer program products for passively routing SSL encoded network traffic. In one example, the SSL encoded network traffic can be passively obtained and routed for the purpose of load balancing. According to one aspect, a method for routing duplex SSL encoded network traffic can include passively receiving a copy of SSL encoded network traffic. Further, the method can include passively parsing the received network traffic and generating an identical copy of the network traffic such that the network traffic is not decrypted and without interfering with the network traffic. A target output network device can be selected for transmission of the identical copy of the network traffic. Further, the selected target output network device can transmit the identical copy of the network traffic.

In one application of the subject matter described herein, SSL encoded TCP/IP network traffic can be passively collected. SSL is a protocol used to encrypt network payloads. During the SSL protocol negotiation, symmetric keying material is exchanged by communication endpoints. This symmetric keying material is used to encrypt each data packet used to communicate between the endpoints.

To secure transfer of the symmetric keying material between endpoints, asymmetric cryptography is used. Asymmetric cryptography involves the use of public and private keys. Public and private keys are mathematically related such that the public key can be used to encrypt a payload and only the private key can be used to decrypt the payload.

SSL uses asymmetric keys so that it can transfer a public key from one endpoint to another. The receiving endpoint can utilize the received public key to encrypt a secret message and convey it back to the originating endpoint. SSL conveys a symmetric key as the asymmetrically encrypted payload. This symmetric key can then be used by both endpoints for subsequent data encryption/decryption operations.

One of the reasons that SSL uses asymmetric cryptography only for the protocol negotiation is that asymmetric cryptography is more computationally expensive than symmetric cryptography. In fact, the asymmetric negotiation used to securely exchange the symmetric key has a provision for reuse within the SSL protocol.

SSL protocol creates a unique session that can be used to reference a given asymmetric protocol negotiation. As such, an endpoint that has already undergone an asymmetric key exchange can request to reuse the results of that asymmetric key exchange for another protocol negotiation. The reason that it is advantageous to reuse a prior asymmetric key exchange is that the computationally expensive mathematical operations required to do the asymmetric key exchange can be avoided.

When one SSL endpoint attempts to reuse a prior asymmetric key exchange and the other endpoint grants the attempt, the resulting SSL session is referred to as a resumed SSL session. Resumed sessions are unique among SSL sessions in that access to prior negotiated data is required before either endpoint can accomplish encryption or decryption of the data stream. In accordance with the subject matter described herein, copies of passively received duplex data streams that are fed to a system for decryption maintains continuity between original asymmetric key exchange SSL sessions and SSL resumed sessions. To this end, systems in accordance with the subject matter described herein routes all SSL traffic related by key exchange (original and subsequent resumed sessions) to the same target devices. In order to do so, the system analyzes the unencrypted portions of the SSL protocol and determines the unique identifier used to associate SSL operations into a common SSL stream.

FIG. 1 is a block diagram of an exemplary system 100 for passively routing SSL encoded network traffic according to an embodiment of the subject matter described herein. System 100 can be included within desktop grade general purpose (PC) computer hardware, workstation grade (PC) computer hardware, server grade (PC) computer hardware, headless networking infrastructure hardware, or any computing device capable of interfacing with a TCP/IP network or other suitable network. Referring to FIG. 1, system 100 can include a passive duplex network capture module CM configured to interface with a source network SN for passively receiving a copy of SSL encoded network traffic from source network SN. System 100 passively receives network traffic copies such that source network SN is not participated with or otherwise interfered. A duplex TCP parsing engine TPE can identify valid TCP/IP data packets and parse the encoded contents of the packets such that valid TCP streams can be identified. As a result, packet ordering and retransmitted packets can be managed. TCP parsing engine TPE can output a series of parsed data representing the encoded content of the original network streams without transport layer semantics and duplicated data that is necessary for the conveyance of the data. Additional details of capture module CM and TCP parsing engine TPE are provided in the description below and with respect to FIGS. 3 and 4, respectively.

A duplex SSL parsing engine SPE can be configured to identify SSL encoded data in the output of TCP parsing engine TPE. If encoded SSL traffic is identified, TCP parsing engine TPE does not modify or decrypt the encoded data. Rather, TCP parsing engine TPE parses the unencrypted portion of the SSL protocol to identify SSL ServerHello messages. An SSL ServerHello message is a server's response message to a client. Once SSL ServerHello messages are identified, a unique session identifier can be extracted from the SSL protocol and stored in memory for later use and comparison. This unique session identifier can form a transmission grouping semantic for resumed SSL sessions. Transmit Engine TE can be configured to receive data from the SSL parsing engine SPE with associated transmission grouping semantics. Further, transmit engine TE can be configured to transmit a new copy of each data packet onto one of one or more network interfaces. These network interfaces can feed data to a target network TN. Additional details of SSL parsing engine SPE and transmit engine TE are provided in the description below and with respect to FIGS. 5 and 6, respectively.

Figure 2:
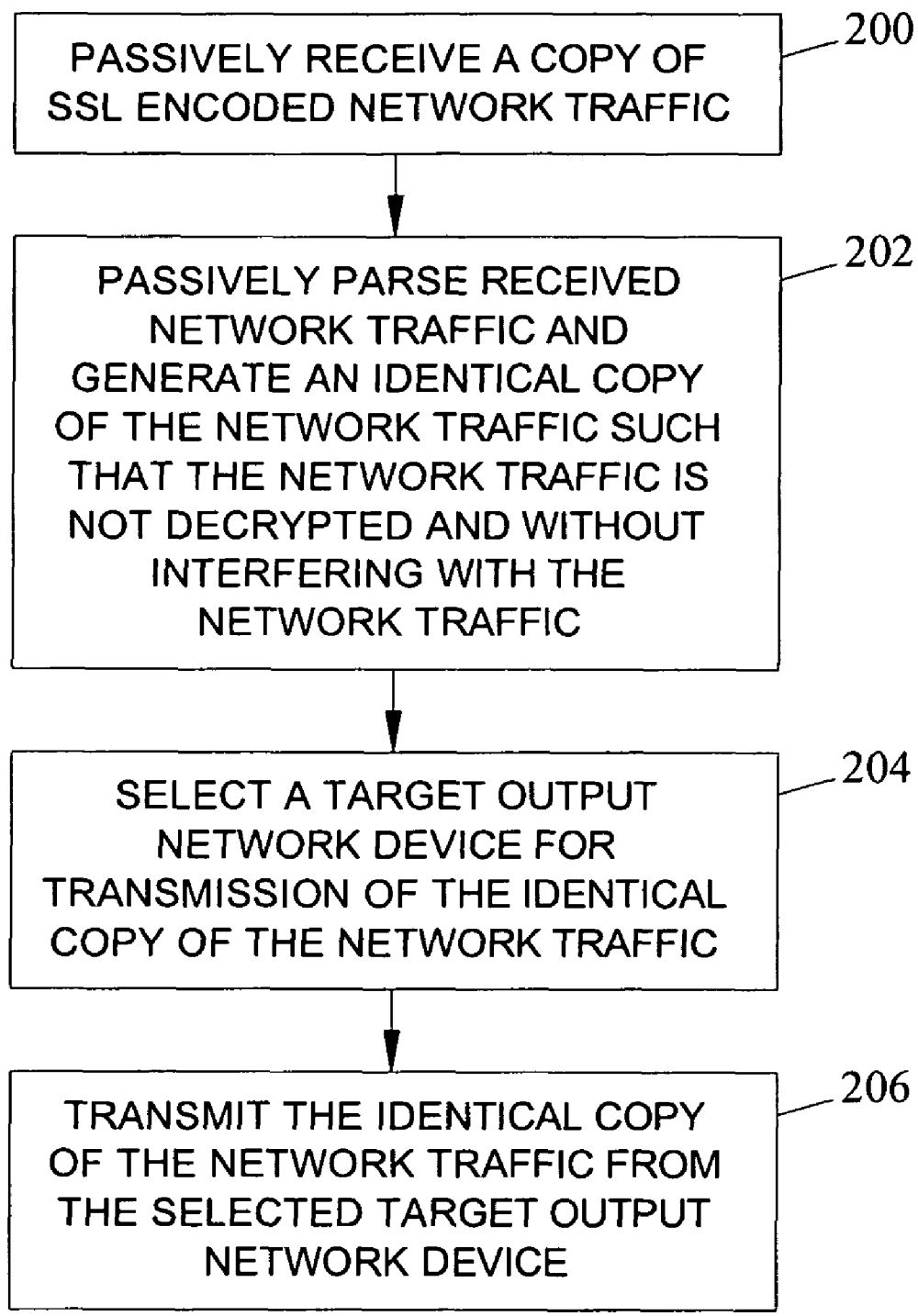
FIG. 2 is a flow chart of an exemplary process for passively routing SSL encoded network traffic using system shown in FIG. 1 according to an embodiment of the subject matter described herein.

FIG. 2 is a flow chart illustrating an exemplary process for routing SSL encoded network traffic using system 100 shown in FIG. 1 according to an embodiment of the subject matter described herein. Referring to FIG. 2, in block 200 a copy of SSL encoded network traffic can be passively received by capture module CM. Source network SN can be configured to communicate original network traffic between endpoints. For example, source network SN can communicate network traffic between a client device and a server. The network traffic can include TCP/IP data packets, such as SSL encoded network traffic. Capture module CM can passively receive some or all of the originating network traffic being communicated by source network SN such that the network traffic is not participated with or interfered with by capture module CM or any other component of system 100. Further, capture module CM can be configured to forward the received network traffic to TCP parsing engine TPE.

Figure 3:
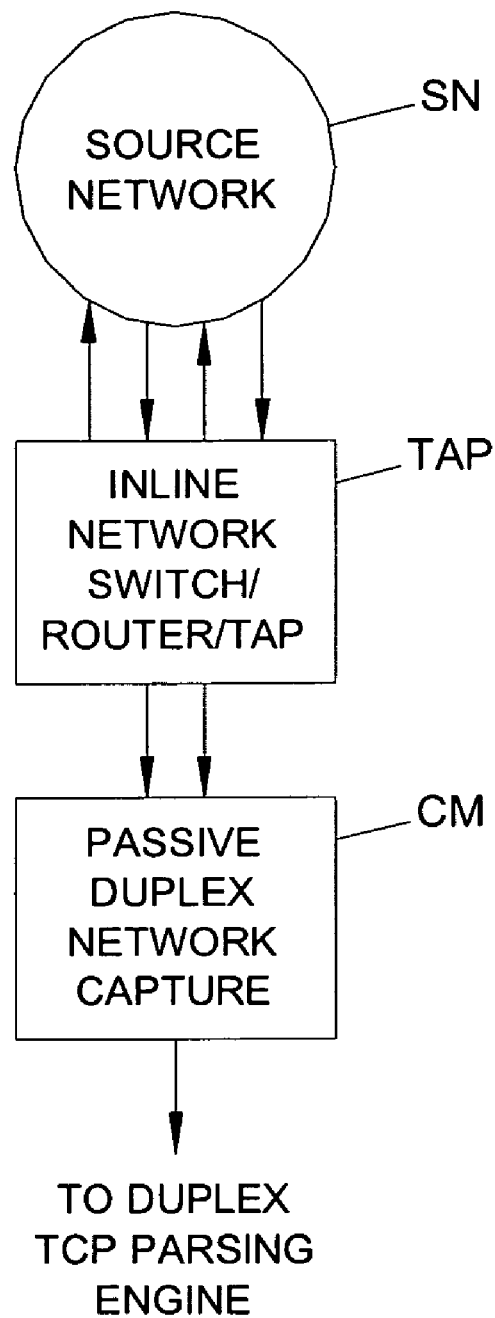
FIG. 3 is a block diagram of a physical line test port analyzer (TAP) for interfacing the system of FIG. 1 with a source network according to an embodiment of the subject matter described herein.

FIG. 3 is a block diagram illustrating a physical line test port analyzer (TAP) TAP for interfacing system 100 with source network SN according to an embodiment of the subject matter described herein. Referring to FIG. 3, in one example, source network SN can be configured to make copies of the network traffic of source network SN. Alternatively, rather than TAP TAP, source network SN can include an inline network switch, a router or other suitable network configured to make copies of the network traffic of source network SN. Capture module CM can interface with TAP TAP for receiving the copied network traffic. In one example, capture module CM can run on a computer medium device and interface with network ports that are part of the computer medium device. The network ports can be physically connected, via appropriate network interface mediums, to TAP TAP. Further, capture module CM can receive data packets from one or more network ports. Received packets can include TCP/IP encoded packets and can be represented within the computer medium device as a block of computer readable medium dynamic memory. As received, a pointer to each block of memory representing a network data packet can be passed to TCP parsing engine TPE shown in FIGS. 1 and 4.

Referring again to FIG. 2, in block 202, the received network traffic is parsed without decryption or participation in the communication. Further, in block 202, an identical copy of the network traffic is generated. TCP parsing engine TPE can be configured to parse TCP/IP data packets. In particular, TCP parsing engine TPE can identify valid TCP/IP data packets and parse the encoded contents of the packets such that valid TCP streams can be identified. Each valid TCP/IP packet can include a sequence of bytes of information divided into fields of fixed or variable, but specified lengths. Fields can be divided into layered groupings denoted as the Ethernet header fields, IP header fields, and TCP header fields. The type field of the Ethernet frame can be examined to determine if the packet is an IP packet. Once it is identified as an IP packet the protocol field of the IP header can be examined to determine if the packet is a TCP packet. Once it is identified as a TCP packet then the source IP address, source port, destination IP address, and destination port fields can be pulled out in order to map this packet to the TCP stream that it belongs, as described herein.

Figure 4:
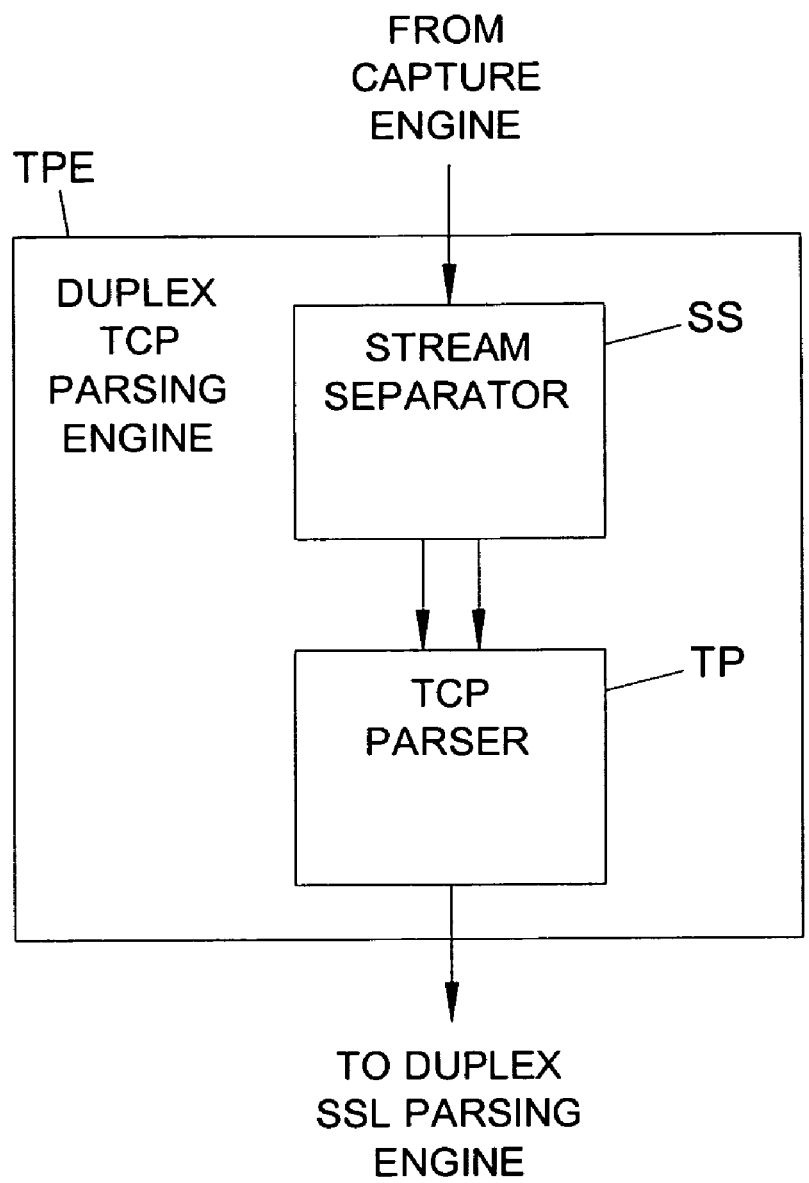
FIG. 4 is a block diagram of exemplary components of a transmission control protocol (TCP) parsing engine according to an embodiment of the subject matter described herein.

FIG. 4 is a block diagram illustrating exemplary components of TCP parsing engine TPE according to an embodiment of the subject matter described herein. Referring to FIG. 4, a stream separator SS of TCP parsing engine TPE can receive TCP/IP encoded packets from capture module CM. The packet data can be represented in computer readable memory. As such, in this example, the operations of the TCP parsing engine TPE may operate only with input from computer readable memory. Stream Separator SS can analyze each packet and parse out relevant fields related to source and destination IP addresses and/or source and destination ports. Further, received data packets can be parsed for identifying the transmission direction of the packet. Transmission directions can be either from client to server, or from server to client. Once data is separated based on original transmission direction, each data packet can be passed to a TCP parser TP.

TCP parser TP can perform additional parsing on each data packet. In particular, packets can be inspected to determine their packet type. Duplicate packets may be disregarded by TCP parser TP. Further, TCP parser TP can determine packet ordering. If packets are not received in the order that they were originally transmitted, TCP parser TP can buffer the disordered packets until previously transmitted packets are received. When the previously transmitted packets are received, TCP parser TP can properly order the buffered packets and their corresponding previously transmitted packets. The properly order packets can be passed to SSL parsing engine SPE.

Figure 5:
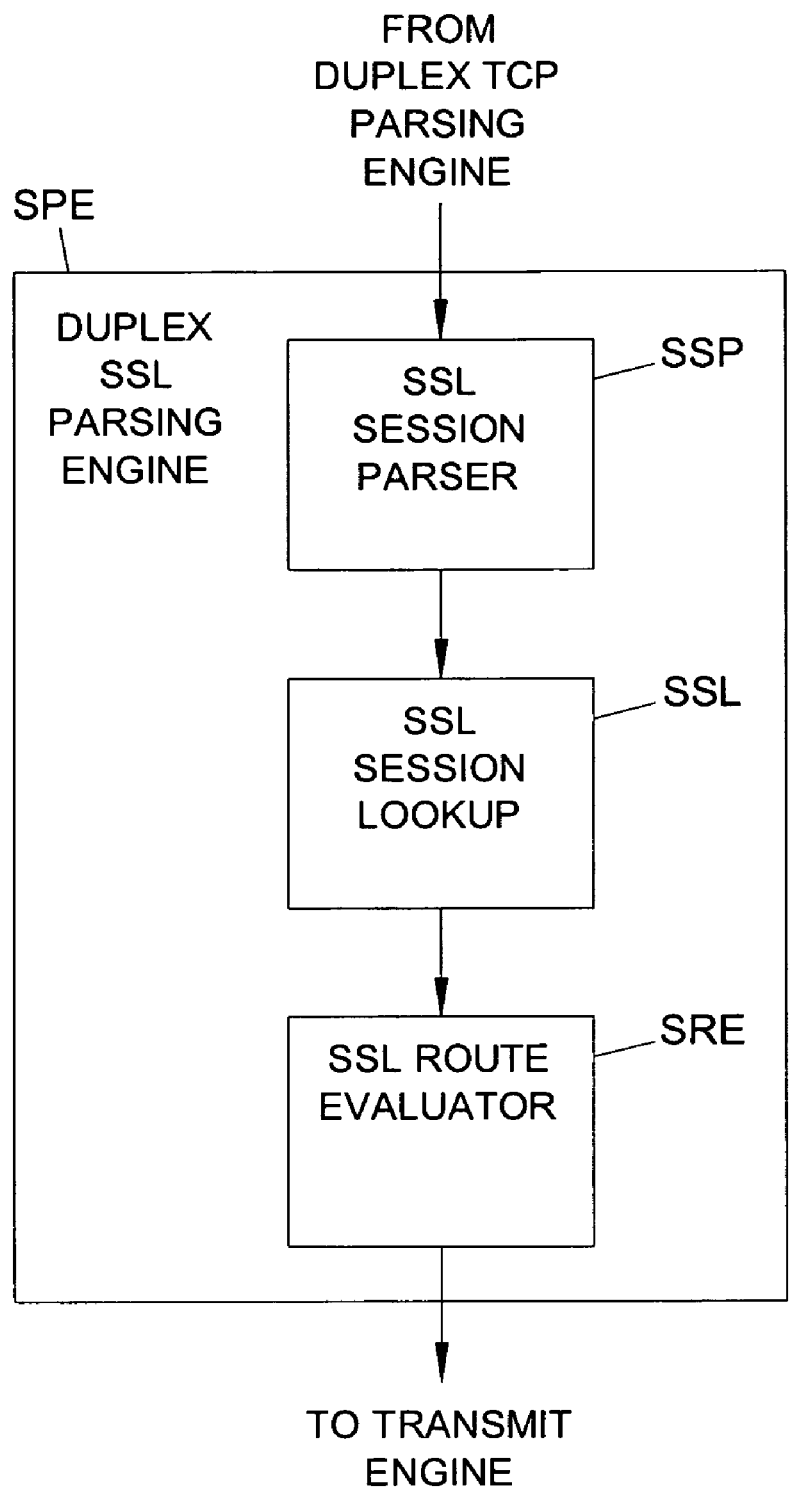
FIG. 5 is a block diagram of exemplary components of an SSL parsing engine according to an embodiment of the subject matter described herein.

FIG. 5 is a block diagram illustrating exemplary components of SSL parsing engine SPE according to an embodiment of the subject matter described herein. Referring to FIG. 5, an SSL session parser SSP of SSL parsing engine SPE can receive packet data from TCP parsing engine TPE. SSL session parser SSP can identify whether the received data represents SSL encoded data. If it is determined that the received data does not represent SSL encoded data, the data can be passed through without further inspection or processing. If it is determined that the received data represents SSL encoded data, SSL session parser SSP can parse the data in accordance with the SSL protocol.

The SSL protocol consists of a series of message types that are used to convey the exchange of keying material and encrypted data. System 100 does not decrypt the SSL encrypted data payloads, nor does it have access to the keying material necessary to accomplish such decryption.

An example of SSL session initiation between a server and client includes the following steps: (1) a client sends a ClientHello message to a server; (2) the server responds with a ServerHello, Certificate and ServerHelloDone messages; (3) the client sends a ClientKeyExchange message, a ChangeCipherSpec message, and a Finished message; and the server responds with a ChangeCipherSpec and Finished messages. SSL session parser SSP can determine whether any of the received messages are ServerHello messages. If it is determined that a message is a ServerHello message, SSL session parser SSP a unique session identifier is extracted from the message and associated with all subsequent data messages in the same TCP stream of data. Up until the point when the ServerHello message is received, any packet received prior is queued and buffered by the SSL session parser SSP.

SSL session parser SSP can pass the data to a SSL session lookup function SSL. Function SSL can use the extracted unique identifier SSL session parser SSP to find or create a data structure associated with the unique identifier. A map data structure can be used to associate the session identifier to the session context which contains the output network device used to transmit the original new session. If the SSL session is a new SSL session then a new map entry in created to hold the next output network device that is selected by the load balancing algorithm LBA of the transmit engine TE as described herein. If the SSL session is a resumed SSL session then the unique session ID can be mapped to an existing session context data structure that contains the target output network device that should be used for this resumed session, which ensures that this resumed session goes out the same output network device that was used by the new session that is being resumed.

An SSL route evaluator SRE can receive output from SSL session lookup function SSL. The data structure containing information about the SSL stream that was associated with the SSL stream can be used by SSL route evaluator SRE to determine whether any given SSL stream should follow the same transmission route as any prior SSL transmission stream. The output of the SSL route evaluator SRE and encoded data stream packets can be forwarded to transmit engine TE.

Figure 6:
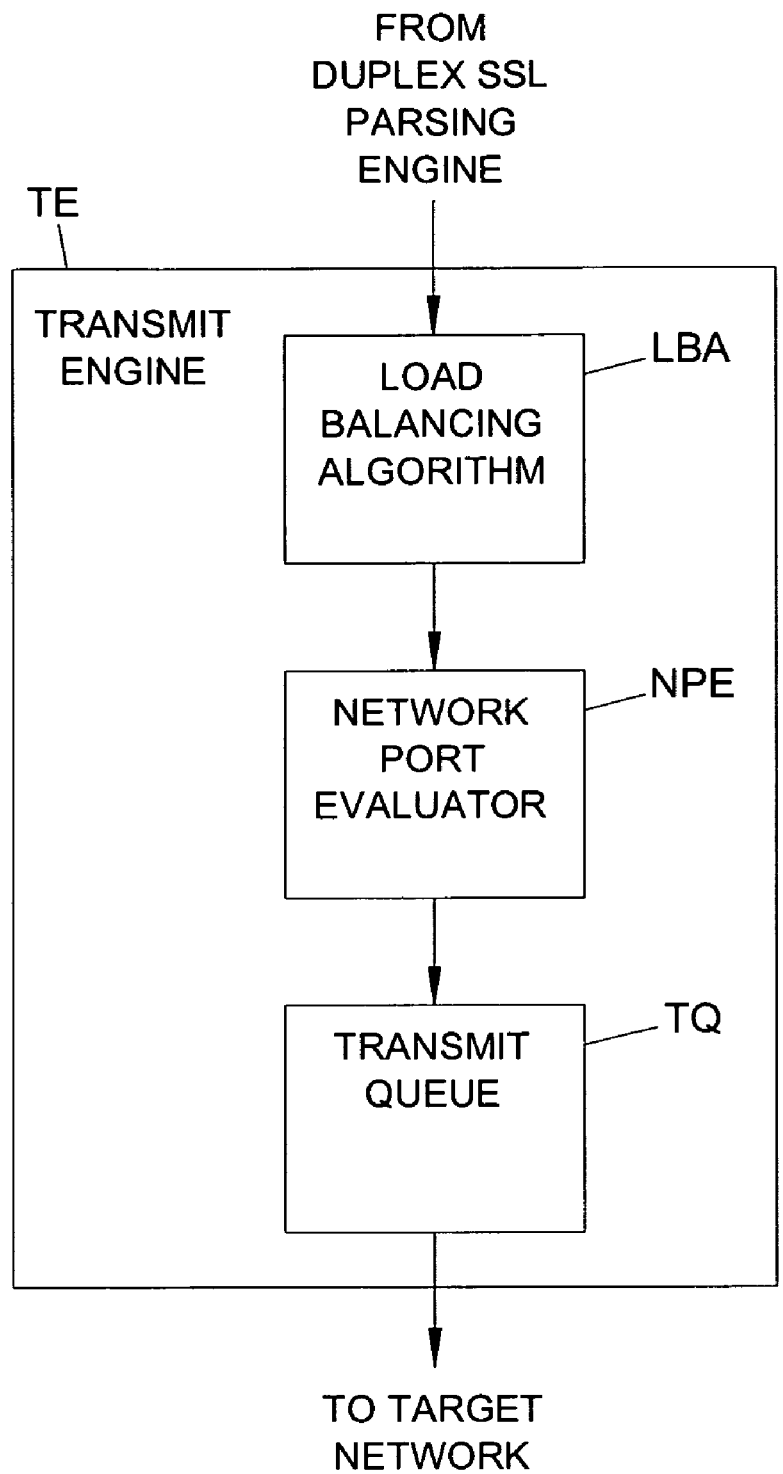
FIG. 6 is a block diagram of exemplary components of a transmit engine according to an embodiment of the subject matter described herein.

Referring again to FIG. 2, in block 204, a target output network device can be selected for transmission of the identical copy of the network traffic. In block 206, the identical copy of the network traffic can be transmitted from the selected target output network device. As described in further detail herein, transmit engine TE can include components for selecting a target output network device for transmission of the identical copy of the network traffic and for transmitting an identical copy of the network traffic from the selected target output network device. FIG. 6 is a block diagram illustrating exemplary components of transmit engine TE according to an embodiment of the subject matter described herein. Referring to FIG. 6, transmit engine TE can include a load balancing algorithm function LBA configured to receive input from SSL parsing engine SPE. Further, function LBA can determine the process by which a received stream of SSL encoded data is routed. An example of a routing algorithm that can be applied by function LBA includes the round robin technique. Function LBA can operate to load balance the network traffic among the target output network devices.

Network port evaluator NPE can physically interface with transmission devices for communicating the SSL encoded data onto target network TN. In one example, network port evaluator NPE can evaluate which network ports, if any, are capable of transmitting traffic to target network TN. Further, transmit engine TE can include a transmit queue TQ configured to receive data to be transmitted to the target network. Further, transmit queue TQ can be configured to generate identical copies of network traffic and to send copies to the network port specified by the network port evaluator NPE. Should the network port be unable to transmit the data packet at the time requested, the network port evaluator NPE can queue the data packet for later transmission to target network TN. As a result of the exemplary process of FIG. 2, duplex SSL encoded network traffic on source network SN is passively copied and load balanced onto selected target output network devices interfacing with target network TN.

Systems, methods, and computer program products in accordance with the subject matter described herein are advantageous, for example, because they can be employed for passively routing SSL encoded network traffic such that the network traffic is not decrypted and without interfering with the network traffic. Further, for example, network traffic copies can be parsed without requiring decryption of the SSL encoded network traffic. In particular, for example, the network traffic copies can be parsed without requiring access to SSL private keying material necessary for decryption of the SSL encoded network traffic.

The subject matter described herein may be implemented using a computer readable medium containing a computer program, executable by a machine, such as a computer. Exemplary computer readable media suitable for implementing the subject matter described herein include chip memory devices, disk memory devices, programmable logic devices, application specific integrated circuits, and downloadable electrical signals. In addition, a computer-readable medium that implements the subject matter described herein may be located on a single device or computing platform or may be distributed across multiple devices or computing platforms.

The executable instructions of a computer program for carrying out the methods illustrated herein can be embodied in any machine or computer readable medium for use by or in connection with an instruction execution machine, system, apparatus, or device, such as a computer-based or processor-containing machine, system, apparatus, or device, that can read or fetch the instructions from the machine or computer readable medium and execute the instructions.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for passively routing secure socket layer (SSL) encoded network traffic, the method comprising:
    (a) passively receiving a copy of SSL encoded network traffic;
    (b) passively parsing the received network traffic and generating an identical copy of the network traffic such that the network traffic is not decrypted and without interfering with the network traffic;
    (c) selecting a target output network device for transmission of the identical copy of the network traffic; and
    (d) transmitting the identical copy of the network traffic to an external network through the selected target output network device, wherein
    passively parsing the received network traffic is performed such that decryption of the network traffic is not required,
    passively parsing the received network traffic is performed without requiring access to SSL private keying information for decryption of the network traffic,
    passively parsing the received network traffic includes extracting a unique identifier from an unencrypted portion of an SSL ServerHello message of the network traffic, and
    selecting a target output network device includes selecting the target output network device based on the extracted unique identifier.

2. A method for passively routing secure socket layer (SSL) encoded network traffic, the method comprising:
    (a) passively receiving a copy of SSL encoded network traffic;
    (b) passively parsing the received network traffic and generating an identical copy of the network traffic such that the network traffic is not decrypted and without interfering with the network traffic;
    (c) selecting a target output network device for transmission of the identical copy of the network traffic; and
    (d) transmitting the identical copy of the network traffic to an external network through the selected target output network device, wherein passively parsing the received network traffic includes identifying an SSL server response message and using a session identifier in the message for grouping associated messages in the same session.

3. A computer program product comprising computer-executable instructions embodied in a non-transitory computer-readable medium for performing steps comprising:
    (a) passively receiving a copy of SSL encoded network traffic;
    (b) passively parsing the received network traffic and generating an identical copy of the network traffic such that the network traffic is not decrypted and without interfering with the network traffic;
    (c) selecting a target output network device for transmission of the identical copy of the network traffic; and
    (d) transmitting the identical copy of the network traffic to an external network through the selected target output network device, wherein passively parsing the received network traffic is performed such that decryption of the network traffic is not required, passively parsing the received network traffic is performed without requiring access to SSL private keying information for decryption of the network traffic, passively parsing the received network traffic includes extracting a unique identifier from an unencrypted portion of an SSL ServerHello message of the network traffic, and selecting a target output network device includes selecting the target output network device based on the extracted unique identifier.

4. A computer program product comprising computer-executable instructions embodied in a non-transitory computer-readable medium for performing steps comprising:

(a) passively receiving a copy of SSL encoded network traffic;

(b) passively parsing the received network traffic and generating an identical copy of the network traffic such that the network traffic is not decrypted and without interfering with the network traffic;

(c) selecting a target output network device for transmission of the identical copy of the network traffic; and (d) transmitting the identical copy of the network traffic to an external network through the selected target output network device, wherein passively parsing the received network traffic includes identifying an SSL server response message and using a session identifier in the message for grouping associated messages in the same session.

* * * * *

UNITED STATES PATENT AND TRADEMARK OFFICE
CERTIFICATE OF CORRECTION

PATENT NO. : 7,953,973 B2
APPLICATION NO. : 11/655722
DATED : May 31, 2011
INVENTOR(S) : Beam et al.

Page 1 of 1

It is certified that error appears in the above-identified patent and that said Letters Patent is hereby corrected as shown below:

On the title page, add item [63].

--Related U.S. Application Data

Provisional application No. 60/874,795 filed on Dec. 14, 2006.--.

Signed and Sealed this
Second Day of October, 2012

David J. Kappos
*Director of the United States Patent and Trademark Office*